United States Patent [19]

Anderson

[11] 4,243,411
[45] Jan. 6, 1981

[54] REDUCTION OF METAL SULFIDES

[75] Inventor: Robert N. Anderson, Palo Alto, Calif.

[73] Assignee: Parlee-Anderson Corporation, Redwood City, Calif.

[21] Appl. No.: 38,382

[22] Filed: May 14, 1979

[51] Int. Cl.³ .................................................. C22B 31/00
[52] U.S. Cl. .............................................. 75/69; 75/21; 75/23; 75/28; 75/70; 75/71; 75/72; 75/77; 75/80; 75/82; 75/86
[58] Field of Search .................... 75/21, 23, 69, 70, 71, 75/72, 77, 80, 82, 86, 28

[56] References Cited

U.S. PATENT DOCUMENTS

| | | | |
|---|---|---|---|
| 807,271 | 12/1905 | Imbert | 75/21 |
| 894,383 | 12/1908 | Imbert | 75/21 |
| 2,364,727 | 12/1944 | Lebedeff | 75/85 |
| 2,653,868 | 9/1953 | Lichty | 75/72 |
| 3,463,630 | 8/1969 | Todd | 75/71 |
| 3,861,904 | 1/1975 | Othmer | 75/68 R |

Primary Examiner—M. J. Andrews
Attorney, Agent, or Firm—Flehr, Hohbach, Test, Albritton & Herbert

[57] ABSTRACT

A method for the recovery of a desired metal (e.g., copper) from its sulfide ore by reaction with process metal (e.g., aluminum) capable of forming at least a high sulfide and subsulfide compound. The aluminum subsulfide compound is reacted with the copper sulfide at a first temperature to reduce the copper to metal form and to convert the aluminum to the high sulfide form. Then, the copper metal is separated and the aluminum high sulfide may be reconverted to the subsulfide form by heating to a second higher temperature at which the low sulfide is stable. After separation of the reduced sulfur, the aluminum subsulfide is recycled to reduce additional copper metal without consumption of process metal. The procedure may also be used to reduce and separate two or more metal sulfides (e.g., $CuFeS_2$) by selective reduction with controlled amounts of processed metal.

19 Claims, 3 Drawing Figures

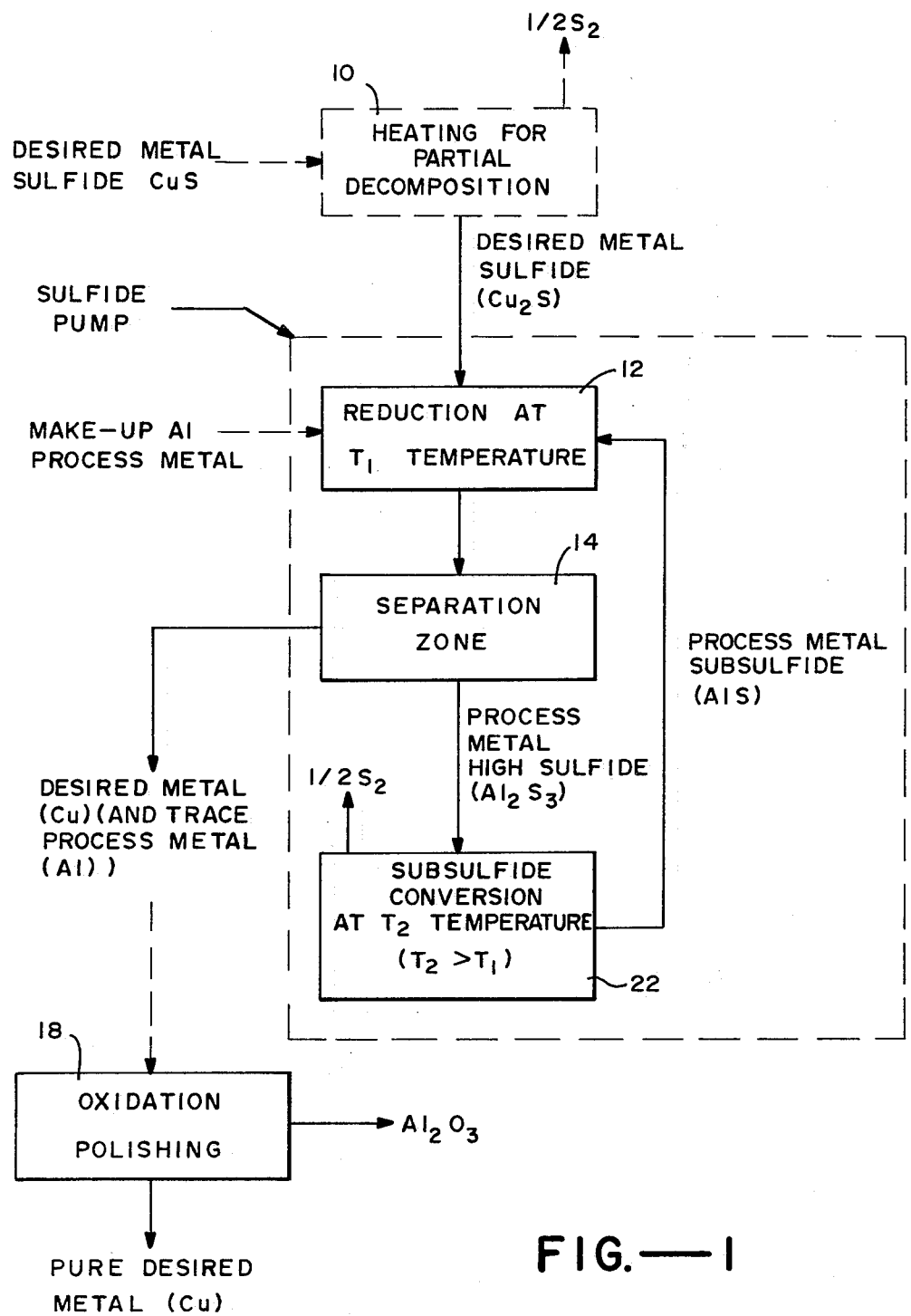
FIG.—1

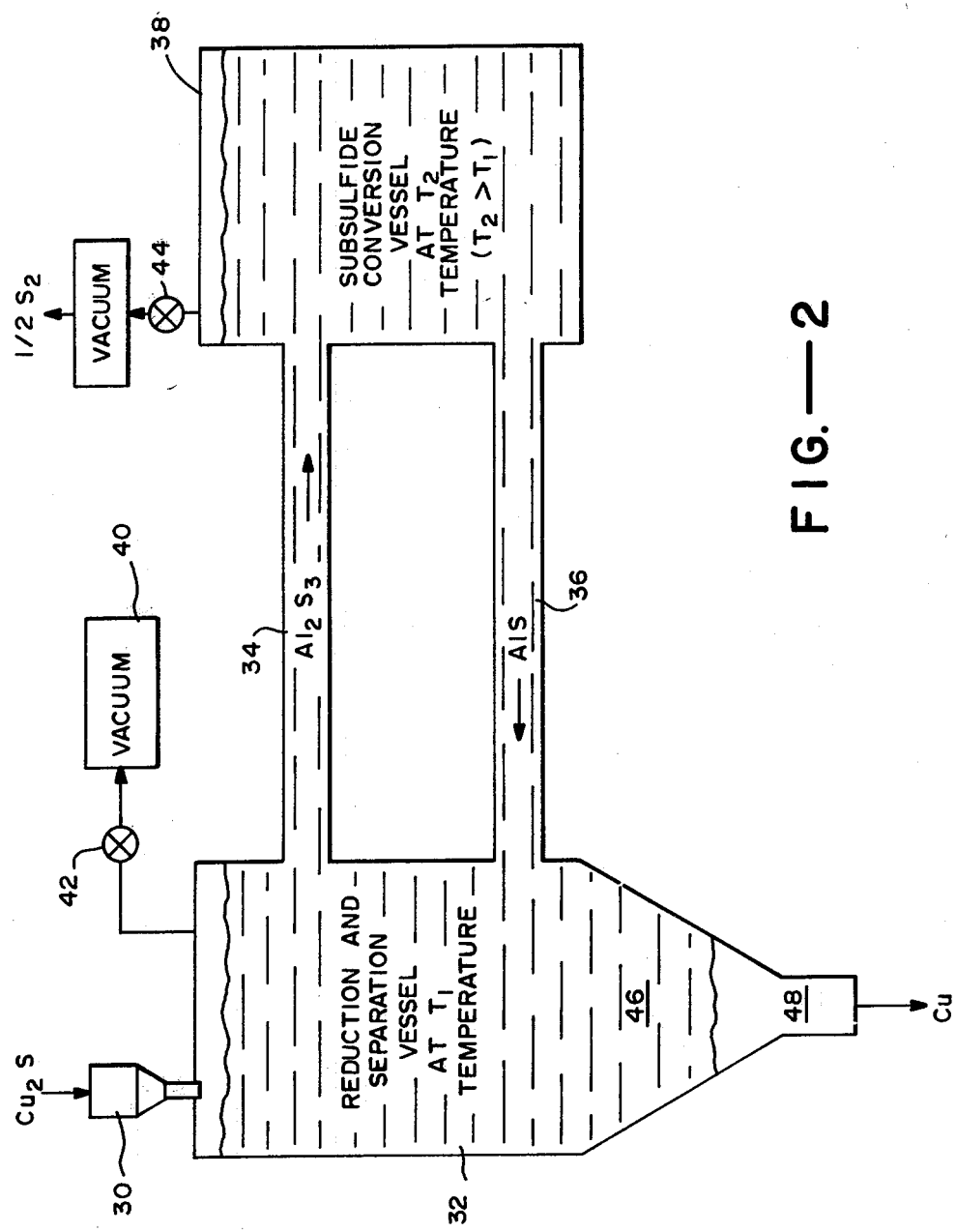
FIG.—2

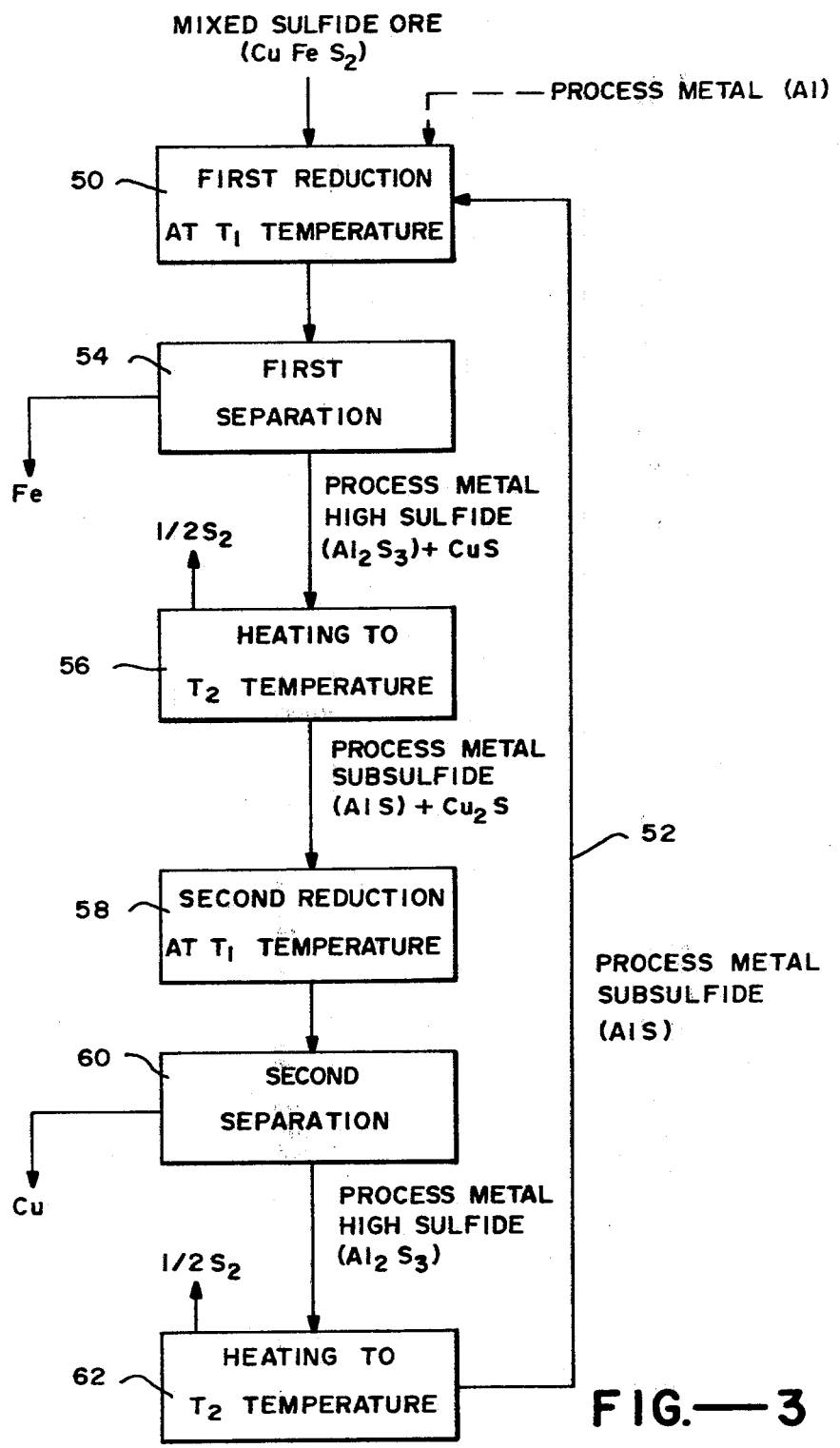
FIG.—3

REDUCTION OF METAL SULFIDES

BACKGROUND OF THE INVENTION

The present invention relates to the recovery of metals from their sulfide ores.

Conventional processing of metal sulfide ores such as copper sulfide includes first subjecting the sulfides to concentration procedures such as flotation and then roasting the concentrates to produce a matte which is reduced to impure metallic metal which is then refined to a desired purity. In this pyrometallurgical technique, the sulfur values in the concentrates form gaseous sulfur oxides during the roasting phase which, when released to the atmosphere, cause significant air pollution. There are strict environmental standards for minimizing air pollution of this type. Accordingly, there is a need for economical alternative methods for reducing sulfide ores without producing harmful sulfur oxides.

SUMMARY OF THE INVENTION AND OBJECTS

It is an object of the invention to provide an economical method for reducing a metal sulfide without producing sulfur oxides.

It is a particular object of the invention to provide a method of the foregoing type for sequentially reducing two or more metal sulfides in a complex sulfide ore to form isolated metal products.

It is an additional object of the invention to provide a process of the foregoing type capable of producing a useful alloy of the reduced sulfide with a metal other than the ones in the complex ore.

It is another object of the invention to provide a method of the foregoing type capable of continuous or batch operation.

One aspect of this invention is a process for forming a desired metal in reduced form from a sulfide compound of the desired metal, comprising reducing said desired metal sulfide in its lowest valence state to metallic form by reaction with a process metal in the free metal or subsulfide form in a liquid or molten bath, said process metal being capable of forming a higher oxidation state process metal high sulfide compound stable in a lower predetermined first temperature range and a lower oxidation state process metal subsulfide compound stable in a higher predetermined second temperature range, said process metal being more reactive than said desired metal and forming a more stable sulfide compound than said desired metal, said reducing reaction being performed in said first temperature range so that a substantial portion of said process metal compound is converted to its high sulfide form while said desired metal sulfide is reduced to its metallic form.

A second aspect of this invention is a process for forming a desired metal in reduced form from a sulfide of the desired metal, comprising the steps of reducing said desired metal sulfide to metallic form by reaction with a process metal subsulfide in a liquid or molten bath at an elevated temperature, said process metal being more reactive than said desired metal and forming a more stable sulfide than said desired metal at said elevated temperature.

The objects of this invention can be attained by a process comprising reducing a desired metal sulfide in its lowest valence state to the metallic form by reaction with a process metal subsulfide or precursor of said metal subsulfide in a liquid or molten bath, said process metal being capable of forming a higher oxidation state process metal high sulfide compound stable in a lower predetermined first temperature range and a lower oxidation state process metal subsulfide compound stable in a higher predetermined second temperature range, said process metal being more reactive than said desired metal and forming a more stable sulfide compound than said desired metal, said reducing reaction being performed in said first temperature range so that a substantial portion of said process metal compound is converted to its high sulfide form while said desired metal sulfide is reduced to its metallic form. Basically, this invention provides a method of converting sulfide compounds of a desired metal into the free metal by treatment with a process metal in the subsulfide form. Further, by suitable choice of the process metal subsulfide, it is possible to provide a cyclic process wherein the process metal higher valence sulfide is disproportioned into the original starting process metal subsulfide compound and sulfur. Since the cyclic process can be initiated by starting with either free process metal or process metal subsulfide, it is immaterial for the purposes of the cyclic aspects of this invention whether or not the first conversion of desired metal sulfide into free metal is carried out with the process metal in the free metal or subsulfide form. In either case process metal high sulfide is converted into subsulfide for subsequent cycles.

In accordance with the above objects, a desired metal (e.g., Cu) is reduced from its lowest valent state sulfide ($Cu_2S$) by reaction with a process metal sub-sulfide (e.g., AlS). The process metal is capable of forming a high sulfide ($Al_2S_3$) at one temperature and a subsulfide ($Al_2S$) at a lower temperature. The reaction with $Cu_2S$ is performed at the lower temperature so that the process metal subsulfide is converted to its high sulfide form while the copper is reduced to metal form and separated. The $Al_2S_3$ can be converted to the subsulfide form (AlS) by heating to a temperature at which the subsulfide is stable and removing the sulfur as by vaporizing. Then, the AlS can be recycled to the cooler reduction zone for reducing additional $Cu_2S$.

In another embodiment of the invention, a complex mixed sulfide ore can be sequentially processed by the above technique to produce isolated reduced metals. Specifically, only so much of the process metal or its subsulfide is employed in the initial reaction which is capable of reducing one of the metals which is then separated in reduced form. Then, additional process metal or its subsulfide is added to reduce the second metal sulfide in the mixed ore. The process metal subsulfide is converted to high sulfide which can be reconverted to subsulfide by the foregoing technique of heating to a temperature at which the subsulfide is stable and removing the produced elemental sulfur. This process metal subsulfide can be recycled as the process metal for reducing additional sulfide ore.

BRIEF DESCRIPTION OF THE DRAWINGS

FIG. 1 is a schematic flow diagram illustrating a continuous process for the reduction of copper sulfide in accordance with the invention.

FIG. 2 is a schematic view of apparatus suitable for continuous operation of the process illustrated in FIG. 1.

FIG. 3 is a schematic flow diagram illustrating the reduction and isolation of at least two metals from a mixed sulfide ore in accordance with the invention.

DETAILED DESCRIPTION OF THE PREFERRED EMBODIMENTS

FIG. 1 illustrates a schematic flow diagram of a continuous process in accordance with the present invention. One important system to which it is applicable is the reduction of copper sulfide from its sulfide ore in which it is typically present in the high sulfide form (CuS). Thus, the present process will be described with respect to reduction of that metal sulfide although, as set out hereinafter, it is also applicable to reduction of other metal sulfides.

As defined herein, the term "desired metal" refers to the metal in sulfide form, typically derived from its ore, which is reduced to metallic form, either alone or as an alloy, by the present process.

As further defined herein, the "process metal" is the reducing agent for the desired metal. It may be in metallic form or in sulfide form. In the latter instance, the process metal must have at least two different oxidation states. The sulfide of the higher oxidation state process metal is termed the "higher oxidation state process metal high sulfide" or the "process metal high sulfide" while the sulfide of the lower oxidation state process metal is termed the "lower oxidation state process metal subsulfide" or the "process metal subsulfide". The term "process metal sulfide" refers to either the process metal high sulfide or subsulfide.

Referring to step 10, the feed material is a beneficiated or concentrated high grade copper sulfide ore. Assuming the copper sulfide is in its stable high sulfur form (CuS), it is preferable to partially decompose the copper sulfide to its low sulfur form (Cu$_2$S) in accordance with the following equation:

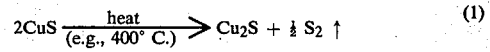

$$2\text{CuS} \xrightarrow[\text{(e.g., 400° C.)}]{\text{heat}} \text{Cu}_2\text{S} + \tfrac{1}{2}\text{S}_2 \uparrow \qquad (1)$$

This partial decomposition is suitably performed at a temperature of about 400° C. It is apparent that one-half of the sulfur is eliminated by this technique. Step 10 may be performed in any type of heated container. The sulfur is collected in isolation from the atmosphere to avoid the formation of sulfur dioxide. As sulfur has a high vapor pressure, it may be collected in elemental gas form and isolated from the remaining Cu$_2$S. If desired, other techniques of separation may be employed. For example, since the Cu$_2$S is far denser than the sulfur in liquid form, a sink-float, liquid-liquid separation system may be employed. The product of step 10 is the desired metal sulfide (Cu$_2$S).

Step 10 is illustrated by dotted lines as it is optional depending upon the ore to be employed. Thus, if the metal of the ore has only one stable oxidation state in combination with sulfur then step 10 would serve no purpose.

Referring to step 12, the partially reduced desired metal sulfide (Cu$_2$S) is then reduced at temperature T$_1$. Typically, prior to passage into the reduction zone for step 12, it would pass through a storage tank to allow for surge capacity to provide even flow. Such a holding step is not illustrated.

In step 12, the desired metal is reduced to elemental form in a bath of process metal subsulfide. A particularly suitable process metal is aluminum with a subsulfide form of AlS. The high sulfide form of aluminum is Al$_2$S$_3$. Thus, the reduction of the copper sulfide is performed with aluminum as the process metal in accordance with the following equation (2):

$$2\text{AlS} + \text{Cu}_2\text{S} \rightarrow 2\text{Cu} + \text{Al}_2\text{S}_3 \qquad (2)$$

Referring again to equation (2), it is apparent that during the reduction reaction the process metal subsulfide (AlS) is converted to its high sulfide form (Al$_2$S$_3$). As will be described below, the process metal high sulfide is reconverted to subsulfide form and returned in a recycle stream to the reduction zone as a source of process metal subsulfide.

The selected process metal is dependent upon the desired metal. It must be more reactive toward sulfur than the desired metal to form a more stable high sulfide. Also, for the illustrated embodiment, it must be capable of forming its higher oxidation state metal high sulfide compound stable in a lower predetermined first temperature range and a lower oxidation state metal subsulfide compound stable in a higher predetermined second temperature range. Referring to FIG. 1, the lower temperature range at which the metal high sulfide compound is stable is referred to as temperature T$_1$, while the latter temperature is referred to as T$_2$. It is preferable that there be a substantial temperature difference between T$_1$ and T$_2$ so that the stability of the high sulfide and subsulfide forms of the process metal may be readily varied during the process. For efficiency of reduction, the process metal sulfide is preferably in a molten liquid bath at temperature T$_1$ during step 12. Thus, the process metal should be selected so that it is molten at the temperature at which its high sulfide is stable.

A further preferred characteristic of the process metal sulfide is that it be capable of dissolving the desired metal sulfide. This provides the optimum contact for fast reaction. If temperature T$_1$ is not sufficient to melt the desired metal sulfide, the reduction reaction can proceed with solid desired metal sulfide in a bath of liquid process metal sulfide so long as there is sufficient contact time which may be reduced by agitation.

In step 14, the desired metal in elemental form is separated from the reduction zone with the process metal high sulfide (Al$_2$S$_3$) remaining in the separation zone. Although steps 12 and 14 comprise separate steps, if desired, they may be performed in a single reaction vessel. Typically the desired metal is far denser than the process metal high sulfide and so will sink and form a separate phase in a reaction vessel. Depending upon the temperature of reduction, the desired metal may be in the solid or liquid form. In either event, it is readily withdrawn from the bottom of the reduction reaction vessel, as by gravity. If the metal is molten, it can flow as a stream from the vessel. The single or multiple reaction vessels employed for steps 12 and 14 should be lined with a material which is inert to the reaction. Carbon has been found to be effective. However, other materials employed in conventional sulfide processing, e.g., mild iron, could also be employed depending upon the reaction temperature.

The withdrawn desired metal may include trace quantities of process metal (aluminum) in metallic form. If so, it may be treated in optional oxidation polishing step 18. There, oxygen is directed into the reaction vessel at a temperature at which the trace process metal is converted to its oxide form but not the less reactive reduced desired metal. The oxide forms a slag on the metal surface which is removed. A suitable temperature for the copper-aluminum system is on the order of 1200° C. Pure desired metal is recovered as product 20.

In step 18, other impurities more reactive than the desired metal will be oxidized as well as the trace process metals. Unacceptable impurities less reactive than the desired metal may be removed by other known techniques, such as electrolytic refining.

Referring to step 22, the process metal high sulfide is directed to a subsulfide conversion vessel maintained at a temperature of $T_2$ at which the subsulfide is stable but not the high sulfide in accordance with the following equation (3):

$$Al_2S_3 \rightarrow 2AlS + \tfrac{1}{2}S_2 \qquad (3)$$

During this reaction, elemental sulfur is produced which is readily removed as a vapor due to its high vapor pressure. The process metal subsulfide (AlS) is then recycled to the reduction zone for reduction of further desired molten sulfide. Thus, the process metal sulfide is essentially contained in a closed loop with only limited amounts of make-up required.

For a system such as the foregoing one in which the aluminum is the process metal, the reduction reaction is preferably carried out at a temperature below about 1500° C. at which $Al_2S_3$ is stable. Of course, the temperature should be at a level at which the high sulfide compound is stable. Subsulfide conversion of $Al_2S_3$ is performed at a temperature at which AlS is stable, namely, above about 1600° C. This 100° C. temperature differential is sufficient to permit precise control of sulfide stabilities by varying the temperature.

Heat may be supplied to the reaction vessels by conventional techniques. For example, induction heating may be employed for graphite containment of reactants.

The reduction reaction of step 12 is preferably performed under reduced pressure as this assists the conversion from the subsulfide to a high sulfide. It has been found that reduced pressures on the order of 0.1 atmosphere or less materially assist the reduction reaction for the aluminum-copper system.

Referring again to FIG. 1, make-up process metal (Al) is illustrated as an optional component to be added during reduction step 12. This constitutes a relatively minor stream, say on the order of 5 weight % or less of the reaction mixture. The overall effect of adding aluminum to reduction zone is set out in the following equation (4):

$$2Al + 3Cu_2S \rightarrow Al_2S_3 + 6Cu \qquad (4)$$

Referring to equation (4), aluminum is first converted to the subsulfide form (AlS) which reduces the $Cu_2S$ according to equation (2).

It should be understood that the reaction of equation (4) may be beneficial for specialized independent application apart from the scheme of FIG. 1. Thus, free process metal in elemental form in a liquid bath may be reacted with the desired metal sulfide at an elevated temperature. The process metal is selected to be more reactive than the desired metal and to form a more stable sulfide at the temperature of the molten bath. The reduced desired metal formed in this reaction is separated from the bath.

Referring again to FIG. 1, a dotted box is illustrated about steps 12, 14 and 22 and which is identified as a "sulfide pump". This terminology illustrates that the process metal is converted from a subsulfide form to a high sulfide form during reduction of the desired metal and is thereafter reconverted to the subsulfide form for recycle to the reduction zone. In effect, the process metal is being continuously cycled or pumped between its high oxidation state in which it contains more sulfur and a low oxidation state at which it contains less sulfur. Thus, the sulfur removed from the desired metal sulfide by the process metal forms a high sulfide from which the sulfur is released as elemental sulfur which is removed or pumped from the system to permit further reduction without consumption of process metal. This ability to recycle by using such a sulfide pump concept is an essential feature to this embodiment.

Essentially all metal sulfide ores or beneficiated ores of commercial interest may be used as the desired metal sulfide in accordance with the invention. Suitable metals include zinc, nickel, molybdenum, mercury, lead, copper, iron, bismuth, cadmium, arsenic and antimony. Corresponding major sulfide ores include ZnS (sphalerite or wurtzite), NiS (millerite), $Ni_3S_4$ (polydymite), $MoS_2$ (molybdenite), HgS (cinnabar), PbS (galena) and $Cu_2S$ (chalcocite). Corresponding minor minerals include $FeS_2$ (pyrite), $FeS_2$ (pyrrhotite), $Bi_2S_3$ (bismuthinite), CdS (greenockite), $As_2S_3$ (realgar), $Sb_2S_3$ (stibnite), $SnS_2$ in $FeCO_2.SnS_4$ (stannite), MnS (hauerite), $CO_3S_4$ (linnaeite), and $Ag_2S$ (argentite).

The process metal is selected to satisfy the aforementioned requirements for the desired metal to be reduced. Thus, it must include a higher oxidation state at which it forms a metal sulfide high in sulfur content and a lower oxidation state in which it forms a metal subsulfide of lower sulfur content. These two different oxidation states are stable at substantially different temperatures so that variances in temperature will determine its oxidation state. In addition, the process metal should be molten at the temperature of reaction in reduction step 12 and in subsulfide conversion step 22. It is also preferred that the desired metal sulfide be soluble in the process metal sulfide, a condition which is readily satisfied for most metal sulfides.

Suitable process metals depending upon the desired metal sulfide to be reduced and their two sulfide forms are as follows: aluminum (AlS, $Al_2S_3$), titanium (TiS, $Ti_2S_3$, $TiS_2$), zirconium (ZrS, $ZrS_2$), barium (BaS, $BaS_3$), boron ($B_2S_3$, $B_2S_5$), silicon (SiS, $SiS_2$), gallium ($Ga_2S_3$, GaS), indium ($In_2S_3$, $In_2S$), scandium ($Sc_2S_3$, ScS), yttrium ($Y_2S_3$, YS), tantaulum ($TaS_2$, TaS), vanadium ($V_2S_3$, VS), niobium ($Nb_2S_3$, NbS), tungsten ($WS_3$, $WS_2$), cobalt ($CoS_2$, $Co_3S_4$), barium (BaS, $BaS_3$), lanthanium and rare earth metals (RES, $RE_2S_3$) and mixtures of said process metals. As set out above, a particularly effective system includes copper sulfide as the desired metal sulfide and aluminum as the process metal.

It may be advantageous to use mixtures of process metals which form eutectices which melt at substantially lower temperatures than either process metal in the eutectic alone. This permits operation at lower temperatures with rapid kinetics and thus can improve the economics of the system.

The ratio of process metal to desired metals fed to the reduction step 12 should be at least equal to the stoichiometry of the reduction reaction. For example, in the aluminum-copper system, at least 2 moles of AlS should be present for each mole of $Cu_2S$. Otherwise, part of the copper sulfide would be lost. If desired, for some purpose, substantial excess of process metal can be employed to form an alloy of the desired metal and process metal. Thus, if substantial excess of aluminum is employed, the resulting product is an aluminum copper alloy. Of course, in this instance, the oxidation polishing step 18 would be eliminated as the desired product alloy would include process metal.

Referring to FIG. 2, a specific apparatus is illustrated which is suitable for continuous processing. It will be described in terms of the illustrated system, namely, the reduction of copper sulfide using aluminum sulfide as the process metal. The copper is first pretreated as in step 10 of FIG. 1 to form $Cu_2S$ and is then directed into a hopper 30 to provide storage for continuous feed to the system. Hopper 30 is maintained with pressure locks to isolate it from the atmosphere to avoid the presence of oxygen to avoid the formation of sulfur oxides.

The copper sulfide from hopper 30 is directed into reduction and separation vessel 32 which is connected by an upper conduit 34 and a lower conduit 36 to a subsulfide conversion vessel 38.

Vessel 32 is maintained at temperature $T_1$ at which the high sulfide ($Al_2S_3$) is stable while vessel 38 maintained at temperature $T_2$ at which the subsulfide (AlS) is stable. A suitable temperature $T_1$ is less than 1500° C. and temperature $T_2$ is greater than 1600° C.

A vacuum 40 is connected to reduction vessel 32 by appropriate valving 42 to maintain the vessel under reduced pressure. As set forth above, this favors conversion to the high sulfide and conversion of the desired metal to reduced form.

In vessel 38, elemental sulfur is produced which is suitably removed from the system in vapor form through valve 44. Referring to vessel 32, the liquid bath of desired metal sulfide in molten sulfide metal is illustrated at 46 above the desired metal illustrated at 48 in the lower portion of the reaction vessel. This separation readily occurs in aluminum-copper system because copper is far denser than aluminum sulfide and so sinks to the bottom portion of the vessel. Copper may either be removed continuously or intermittently from the bottom of reaction vessel 32.

The process metal high sulfide ($Al_2S_3$) is lighter than the subsulfide (AlS). Thus, in the illustrated system, conduit 34 is positioned at the upper portion of bath 46 at which $Al_2S_3$ is drawn off. Conversely, in vessel 38, the formed subsulfide (AlS) being heavier is readily circulated through lower conduit 36. It is contemplated that the system would operate by convective forces although auxiliary circulation may also be provided.

The system of FIG. 2 provides a relatively simple apparatus for carrying out a continuous or intermittent process in accordance with the invention. Other process metal-desired metal systems may also utilize the same apparatus.

If desired, the entire system could be carried out batchwise in a single reaction vessel by successive modifications of the reaction conditions. This techique will be referred to as batch cycling. In the first cycle, process metal subsulfide is formed into a molten bath at temperture $T_1$ at which the high sulfide is stable. Process metal sulfide is added to the bath and reduction reaction (2) is preferably performed under reduced pressure. When the desired metal has been reduced to elemental form, it may be removed as a solid or in a molten stream from the vessel.

In the second stage of batch cycle, the temperature in the reaction vessel is raised to $T_2$ at which the formed process metal high sulfide is converted to the subsulfide form and sulfur as in equation (3). The sulfur is then removed and the temperature of the molten bath is reduced to $T_1$. Then, additional desired metal sulfide ore may be added for reduction as set out above.

It is apparent from the foregoing that the present process may be carried out batchwise as well as continuously in a single or multiple reaction vessels. A common element of these processes is the sulfide pump in which the process metal is cycled between high sulfide and subsulfide forms, with concommittent removal of sulfur, and so is not consumed during the reaction.

In another embodiment of the process, a complex sulfide ore may be reduced in accordance with the above technique. The process metal is selected in accordance with the foregoing criteria. In addition, it must be more reactive than and form a more stable sulfide than any of the metals desired to be reduced. For purposes of the present discussion, it will be assumed that there are only two of such metals in the complex ore to be reduced. It may be suitable to form as a final product an alloy of both of such metals present in the complex ore. If so, at least a stoichiometric amount of process metal sulfide is utilized as the bath. In this manner, both metals will be reduced and removed as from the bottom of vessel 32 of FIG. 2.

In an alternative of the complex sulfide ore embodiment, the present process can be employed to reduce and separate one of the metals in the process ore isolated from the other. In still a further embodiment, by carrying out additional steps, the other metal in the complex sulfide ore may be subsequently reduced to elemental form and separated from the bath. This system is illustrated in FIG. 3.

The conditions in reduction zone 50 are the same as that set forth with respect to FIGS. 1 and 2 with one additional limitation relating to the stoichiometry of the system. That is, to form the desired metal isolated from the other metal in the mixed sulfide ore, the process metal subsulfide is present in sufficient quantity to combine with the sulfur content associated with the desired metal but insufficient to react with the total combined sulfur content associated with the desired metal and the other metal. The "desired metal" is defined as being less reactive than the "other metal" and so forming a less stable sulfide than the other metal. In other words, only so much process metal sulfide should be present as will reduce the desired metal present but not enough to reduce the other metal sulfide as well.

Referring to FIG. 3, a mixed sulfide ore which has been beneficiated and ground to suitable size is employed as a starting material. One common sulfide ore to which the present system is applicable are chalcopyrite ($CuFeS_2$), bournonite ($PbCuSbS_3$), and natural mixtures of PbS and ZnS. For simplicity of description, the former system will be described with iron being the designated desired metal.

Referring to FIG. 3, in step 50, a mixed sulfide ore ($CuFeS_2$) is directed to the reduction zone maintained at temperature $T_1$ in which process metal sulfide (AlS) in molten form is contained. This process metal is selected to be more reactive than and form a more stable sulfide than either the copper or iron component of the complex sulfide ore. The supply of process metal may be from a recycle line 52 described below. In addition, make-up process metal aluminum (Al) or process metal subsulfide may be added. In step 54, the desired metal (Fe) in elemental form is separated from the system as product isolated from the other metal (copper). As defined, this is because the iron sulfide is less stable than the copper sulfide and so the iron is selectively reduced since there is insufficient process metal to reduce both the iron sulfide and copper sulfide. Broadly stated, the first metal sulfide which is reduced is that of the metal with the lowest free energy of formation.

The stoichiometry of the system determines the amount and character of the metal formed in step 50 and removed in step 54. For example, to isolate and remove only desired metal, the amount of process metal subsulfide is selected to be, no greater than and preferably equal to, the stoichiometric equivalent of the total sulfur content in the liquid reaction bath except for the sulfur in the other metal sulfide which is stable at the reduction reaction temperature in step 50.

If the desired metal stream is an alloy of the desired metal and part or all of the other metal, the amount of process metal is adjusted to fit this stoichiometry. Furthermore, if the ore is a combination of three or more metal sulfides, the "other metal sulfide" refers to all of such metal sulfides stable in step 50 except for the desired metal.

Some sulfide ores include a desired or other metal sulfide which is stable in a high sulfur form (e.g., CuS) but which can be partially decomposed by heat to a low sulfur form (e.g., $Cu_2S$) as set forth in the foregoing equation (1). If so, prior to step 50, the ore can be preheated to remove part of its sulfur content as in step 10 of FIG. 1. Alternatively, the ore containing high sulfur metal sulfide may be fed directly to step 50. Thus, sufficient process metal subsulfide is provided in step 50 to remove this excess sulfur which forms part of the total sulfur content.

Referring to step 56, the remaining bath from first separation zone 54 is heated to temperature $T_2$. This bath includes process metal high sulfide ($Al_2S_3$) and the copper sulfide portion of the mixed sulfide which was not reduced in step 50. During heating step 56, the process metal high sulfide is converted to the sulfide form also producing elemental sulfur. The latter material may be removed as a gas. In addition, during this heating step, the copper sulfide will be converted to the subsulfide in the manner of step 10 of the embodiment of FIG. 1. The sulfur formed during this decomposition step is also removed at the same time.

In second reduction step 58, process metal subsulfide (AlS) and other metal sulfide ($CuS_2$) are cooled to a temperature $T_1$ at which a process metal high sulfide is stable. In addition, preferably the pressure is reduced. This permits reduction of copper sulfide to copper metal while the process metal subsulfide is converted to the high sulfide form in the manner of equation (2).

In second separation step 60, the copper metal is separated from the system. Also, the process metal high sulfide is removed and directed to step 62 in which it is heated to temperature $T_2$ to convert it to the subsulfide form. Elemental sulfur is removed as vapor as set forth above.

In line 52, the process metal subsulfide (AlS) is recycled to the first reduction zone to form the sulfide bath for the reduction of additional mixed sulfide ore.

The same conditions and temperatures $T_1$ and $T_2$ set forth above with respect to the embodiment of FIG. 1 may be employed in the complex sulfur ore embodiment of FIG. 3.

The embodiment of FIG. 3 has been described in terms of a series of different zones. Instead, batch cycling as described above could be employed in which the entire process is carried out in a single reaction vessel. This is analogous to the foregoing batch cycling with respect to reduction of a single metal sulfide. If the complex sulfide ore includes three or more metal sulfides, the process may be modified by additional steps to reduce and separate the further metals in an analogous manner to that of FIG. 3.

In an alternative to the embodiment of FIG. 3, step 56 may be eliminated by the addition of further process metal subsulfide in step 58. In step 62, the quantity of process metal high sulfide formed in step 54 will be reduced along with that formed in step 58.

A further disclosure of the nature of the present invention is provided by the following specific examples of the practice of the invention. It should be understood that the data disclosed serve only as examples and are not intended to limit the scope of the invention.

EXAMPLE 1

20 grams of copper sulfide ($Cu_2S$) was mixed with 20 grams of aluminum sulfide ($Al_2S_3$) in a graphite crucible which was heated in an induction furnace under an argon gas atmosphere to approximately 1600° C., to form a molten phase. Then, the crucible was cooled, to solidify its contents, and broken. The solid contents includes a lower sulfide layer separated from an upper sulfur layer including distributed metallic copper, illustrating the reduction of copper sulfide to metallic form by this method. Sulfur was observed also in the upper cooled portion of the furnace illustrating conversion to sulfur. Moistening of the sulfide layer yielded the smell of $H_2S$ gas illustrating the presence of $Al_2S_3$ by the following formula:

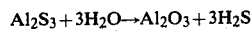

$$Al_2S_3 + 3H_2O \rightarrow Al_2O_3 + 3H_2S$$

EXAMPLE 2

20 grams of reagent grade copper sulfide was mixed with 20 grams of aluminum sulfide and 10 grams of reagent grade aluminum metal in a graphite crucible which was also heated in an induction furnace to 1600° C. and cooled to solidify the contents. The crucible was broken and found to include a top layer of sulfur, an intermediate aluminum sulfide layer and a bottom aluminum copper alloy layer (including some entrained sulfur). The alloy was confirmed by x-ray analysis and density measurements. The aluminum sulfide was confirmed as in Example 1.

What is claimed:

1. A process for the recovery of a desired metal in reduced form from a sulfide compound of the desired metal, comprising the steps of reducing said desired metal sulfide in its lowest valence state to metallic form by reaction with a process metal in the subsulfide form in a liquid or molten bath, said process metal being capable of forming a higher oxidation state process metal high sulfide compound stable in a lower predetermined first temperature range and a lower oxidation state process metal subsulfide compound stable in a higher predetermined second temperature range, said process metal being more reactive than said desired metal and forming a more stable sulfide compound than said desired metal, said reducing reaction being performed in said first temperature range so that a substantial portion of said process metal compound is converted to its high sulfide form while said desired metal sulfide is reduced to its metallic form.

2. The process of claim 1 in which said process metal is molten and said desired metal sulfide is dissolved in said process metal subsulfide.

3. The process of claim 1, where said reduced desired metal is separated and after separation of said desired metal at least a portion of the process metal high sulfide formed in said liquid bath is heated to said second temperature range to form process metal subsulfide and elemental sulfur; at least a portion of elemental sulfur is separated; and the thus-formed process metal subsulfide is reacted with additional desired metal sulfide to reduce it to metallic form.

4. The process of claim 3 in which said reducing reaction is performed in a reduction zone, said subsulfide conversion reaction is performed in a separate subsulfide conversion zone, and said process metal high sulfide formed in said reduction zone is transported to said subsulfide conversion zone while the process metal subsulfide formed in said subsulfide conversion zone is transported to the reduction zone.

5. The process of claim 1 in which said reduction reaction is performed at a subatmospheric pressure.

6. The process of claim 1 in which said process metal is at least one metal selected from the group consisting of aluminum, titanium, zirconium, barium, boron, silicon, gallium, indium, scandium, yttrium, tantaulum, vanadium, niobium, tungsten, cobalt, barium, lanthanum, and rare earth metals.

7. The process of claim 1 in which said desired metal is at least one metal selected from the group consisting of zinc, nickel, molybdenum, mercury, lead, copper, iron, bismuth, cadmium, arsenic, antimony, tin, manganese, cobalt, and silver.

8. The process of claim 1 in which said process metal subsulfide is aluminum subsulfide and said desired metal is copper.

9. The process of claim 1 in which said desired metal in metallic form is of sufficiently different density from that of said liquid or molten bath so that it forms a distinct desired metal phase in the reducing zone, and said desired metal is separated by withdrawing desired metal from said bath.

10. The process of claim 1 in which said desired metal is separated in alloy form with as the process metal.

11. The process of claim 10 in which said desired metal is separated and subjected to oxidizing conditions at which said process metal is oxidized and removed from said separated metal which remains unoxidized.

12. The process of claim 1 in which after said reduction reaction, said desired metal is separated, said liquid bath is heated to said second temperature range for conversion of said process metal high sulfide to process metal subsulfide and elemental sulfur, the sulfur is removed, and additional desired metal sulfur compound is added to the bath and is reduced with said liquid bath in said first temperature range.

13. The process of claim 12 in which said desired metal reduction reaction and subsulfide conversion reactions are performed in a single reaction vessel.

14. A process for the recovery of a desired metal in reduced form from a complex sulfide of the desired metal sulfide and at least one other metal sulfide, said other metal being more reactive than said desired metal and forming a more stable sulfide than said desired metal, said method comprising the steps of selectively reducing said desired metal from its sulfide but not said other metal from its sulfide by reaction with a process metal subsulfide in a liquid bath, said process metal being capable of forming a higher oxidation state process metal high sulfide in a predetermined first temperature range and a lower oxidation state process metal subsulfide stable in a predetermined second higher temperture range, said process metal being more reactive than and forming a more stable sulfide than either said desired metal of said other metal, said reduction reaction being performed at an elevated temperature within said first temperature range, said process metal subsulfide being present in sufficient quantity to reduce at least a portion of the desired metal sulfide but to be no greater than the stoichiometric equivalent of all sulfur in the liquid bath except for the sulfur in the other metal sulfide which is stable at said elevated temperature to thereby reduce at least part of the desired metal of said desired metal sulfide compound to metallic form but not the other metal of its sulfide compound while said process metal subsulfide is converted to its high sulfide form.

15. The method of claim 14 in which after separation of said desired metal from said liquid bath, additional process metal subsulfide is provided in said bath and said other metal sulfide is reduced to metal form while said additional process metal subsulfide is converted to its high sulfide form.

16. The method of claim 15 in which said additional metal subsulfide is provided by heating said bath to said second temperature range for conversion of the process metal high sulfide to process metal subsulfide and elemental sulfur, and the elemental sulfur is separated.

17. The method of claim 14 in which said desired metal is iron and said other metal is copper.

18. The method of claim 14 in which said desired metal is lead and said other metal is zinc.

19. The method of claim 14 in which said process metal subsulfide is approximately stoichiometrically equivalent to all sulfur in the liquid bath except for the sulfur in the other metal sulfide which is stable at said elevated temperature.

* * * * *